United States Patent [19]

Loyd et al.

[11] 3,814,139

[45] June 4, 1974

[54] INSULATING CONNECTOR

[75] Inventors: Patrick V. Loyd, West Laurel; Samuel M. Mills, University Park, both of Md.

[73] Assignee: Stone Industrial Corporation, College Park, Md.

[22] Filed: Aug. 23, 1972

[21] Appl. No.: 282,977

[52] U.S. Cl............................ 138/141, 174/DIG. 8
[51] Int. Cl................................................ F16l 9/12
[58] Field of Search ........... 138/108, 129, 137, 140, 138/141, 144, 154; 174/DIG. 8

[56] References Cited
UNITED STATES PATENTS

| | | | |
|---|---|---|---|
| 2,531,700 | 11/1950 | Porter | 138/137 |
| 3,037,529 | 6/1962 | Hancik | 138/140 |
| 3,294,941 | 12/1966 | Mullen | 174/DIG. 8 |
| 3,382,121 | 5/1968 | Sherlock | 174/DIG. 8 |
| 3,396,460 | 8/1968 | Wetmore | 174/DIG. 8 |
| 3,415,287 | 12/1968 | Heslop et al. | 174/DIG. 8 |
| 3,423,518 | 5/1969 | Weagant | 174/DIG. 8 |
| 3,491,799 | 1/1970 | Foll | 174/DIG. 8 |
| 3,548,079 | 5/1970 | Jones | 174/DIG. 8 |

Primary Examiner—Herbert Goldstein
Attorney, Agent, or Firm—Laurence, Laurence & Neilan

[57] ABSTRACT

A laminated tubular connector for splicing or terminating electric conductors, comprising an outer layer of a heat shrinkable dielectric material, e.g., polyethylene terephthalate, and an inner layer of relatively soft, self-adhesive, low temperature flowable thermoplastic material, preferably a polyvinyl acetate composition. When heat is applied to the connector, the outer layer shrinks and the inner layer functions as a sealant and a cushioning agent. In some applications, the adhesiveness of the inner layer may be used to hold the connector in place during subsequent operations by pinching the connector so that the depressed portions of the tube adhere to each other prior to heating the connector to shrink the outer layer.

6 Claims, 4 Drawing Figures

INSULATING CONNECTOR

BACKGROUND OF THE INVENTION

The present invention relates to electrical connectors and more particularly to laminated synthetic resin electrical connectors which are initially in the form of tubes or sleeves and which can be slipped onto electric conductors to splice or terminate the conductors.

The use of such connectors is known in the art. One type of prior art connector which has met with some success comprises a tubular connector having elastic memory so that upon application of heat the connector shrinks onto the electric conductor. The use of various fusable inserts including solder inserts and polymeric inserts has also been proposed in an effort to improve such known connector structures.

The prior art approaches have not been fully satisfactory particularly when the connectors are to be utilized within systems in which insulating varnishes which should be subjected only to relatively low temperatures, for example, 200°F., are employed. Other problems inherent in prior approaches involve the possibility of breaking fine electric wires when the connector is shrunk onto the wires and, in some manufacturing operations, difficulties are experienced in keeping the connectors properly in place upon the electric conductors before the connectors have been heated to contract them down onto the conductors.

SUMMARY OF THE INVENTION

A primary object of the present invention is to provide an improved insulating connector for electric conductors which is capable of being readily bonded to the conductors.

Another object of the present invention is to provide an improved laminated connector for electric conductors which may be utilized in systems which can be subjected only to relatively low temperatures during the assembly operation.

A further object of the invention is to provide a novel laminated connector having a soft adhesive inner layer which is also capable of functioning as a cushioning layer when encasing fine electric wires.

Other objects and advantages of the present invention will become more apparent as this description proceeds.

Briefly, a presently preferred embodiment of the invention comprises an insulating connector initially in a tubular form having a heat shrinkable, dielectric outer layer which is preferably spirally wound polyethylene terephthalate tubing, and a continuous inner layer of a soft, flowable, adhesive synthetic polymeric material such as appropriately compounded polyvinyl acetate or polyvinyl alcohol. In use, the connector is slipped onto the joint or splice of the electric conductor(s) with a portion of the connector extending along and around the conductor, whether insulated or not, adjacent the splice or termination of the conductor. In some cases, particularly in certain assembly line operations, it is desirable to secure the connector relative to the conductor prior to the time that the connector is heated to shrink it onto the conductor. This initial securement of the connector may be accomplished by squeezing the connector so that opposed portions of the inner layer contact and adhesively unite to each other and may also bond to the conductors. This squeezing may take place either at an end of a connector or at an intermediate point along the length of the connector. Thereafter, the units comprised of the electric conductors and the connectors adhesively secured in place may be transported to another operating station such as an oven or other heating station in which heat is applied to the connectors to shrink the heat shrinkable outer layer and at the same time soften the inner layer so that when the outer layer shrinks the inner layer flows and fully encases the splice or terminal at the ends of the conductors.

The laminated connectors of the invention are produced by spirally winding a thin strip of polyethylene terephthalate which has been conditioned to make it heat shrinkable into tubular form while at the same time extruding a continuous, soft inner layer onto the inside of the spirally wound tube. The inner layer is applied by a solution extrusion technique which is known per se. The polymer constituting the inner layer is applied in a solvent carrier combined with a thickener and a surfactant. If the amount of thickener is too great, the tackiness and flowability of the inner layer of the final product may be insufficient to allow the inner layer to adhere to itself or to allow the inner layer to flow when heat is applied to shrink the outer layer.

DETAILED DESCRIPTION OF THE INVENTION

Figure 1:
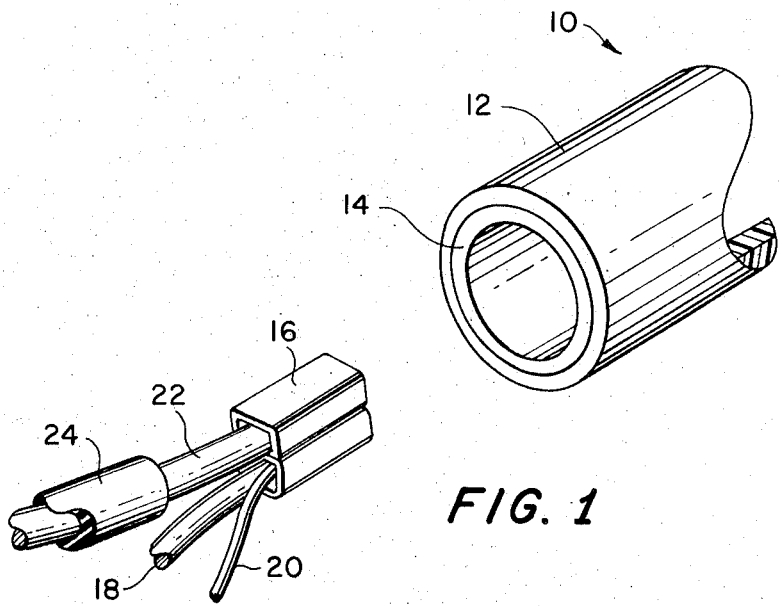
FIG. 1 is a partial perspective view showing a three wire electric connection about to be inserted into a tubular connector of the present invention.

Referring now to the drawing and more particularly to FIG. 1, reference numeral 10 generally designates a laminated connector in accordance with the present invention which is comprised of a relatively rigid, outer sheath or layer 12 of dielectric material and a relatively soft, continuous inner layer 14.

The relatively rigid outer layer 12 consists of a plurality of spirally wound polyethylene terephthalate strips forming an integral outer sheath. Polyethylene terephthalate which is commercially available under the trademark Mylar is an excellent dielectric material and can be obtained in a form which has been treated to be heat shrinkable. In view of the high dielectric properties of polyethylene terephthalate, use of this material enables the wall thickness of the outer layer 12 to be quite thin, for example, a few mils while still giving the final product the desired electrical insulation properties.

The relatively soft inner layer 14 must satisfy a number of requirements. These requirements include that the layer 14 have relatively low temperature flow characteristics so that it does not restrict heat shrinkage of the outer layer 12 and so that the inner layer will flow around and encapsulate the conductors when the outer layer shrinks. Another reason why the inner layer should be capable of flowing at relatively low temperature is that in many instances there are requirements that the electrical junctions be subjected to temperatures of no more than 200°F., the design maximum temperature to which insulating varnish on the conductors should be subjected. The inner layer should also have pressure-sensitive, self-adhesive properties so it will unite to itself when the connector is squeezed so that portions of the inner layer contact one another. The material constituting the inner layer should also be capable of being solution extruded onto the inner surface of the outer layer 12.

Polyvinyl acetate has been found to be particularly suitable for satisfying the above-mentioned diverse requirements. Although presently less preferred, polyvinyl alcohol is also suitable for some uses in which the water solubility of polyvinyl alcohol is not objectionable. The polymer is dissolved in a suitable solvent which will not deleteriously attack the polyethylene terephthalate outer layer. Methyl alcohol is the presently preferred solvent for polyvinyl acetate although other solvents including other lower alcohols such as ethyl alcohol and isopropyl alcohol may also be employed. Water is the solvent for polyvinyl alcohol. The total polymer content of the composition at the time of extrusion is in the range of about 50 – 70 weight percent. In the event that the polymer is obtained commercially in the form of a solution, additional solid polymer may be added while keeping the polymer content in the abovementioned range. A thickener, preferably fumed silica, Cab-o-sil, is added to the solution in an amount of about 4.0 to 8.0 weight percent on a wet basis in order to thicken the solution but the amount of thickener added is controlled so that it is insufficient to reduce the flowability of the polymer or to function as an antiblocking agent, i.e., prevent the polymer from being adhesive after removal of the solvent. Other conventionally employed additives such as dyes, surfactants and plasticizers are also used in the composition. Plasticizers of the phthalate ester class have been found to be particularly useful. The presently preferred surfactant is Adogen, $n$-oleyl propylene diamine, which functions to reduce the amount of thickener required which is employed in a ratio of approximately 5:1 based on the amount of thickener. As will be appreciated by those skilled in the art, the optimum amounts of each component will vary somewhat depending upon such factors as the molecular weight of the polymer, e.g., higher molecular weight polymers generally require less thickener, and optimum amounts can be determined by routine experimentation consistent with the above disclosure.

While other polymers meet one or more of the requirements enumerated above, they do not have all the advantages of the polymers of the invention. For example, polyethylene which is used for many purposes in the electronics industry does not flow at low temperature and thus is not suitable use as the inner layer of the connectors of the present invention.

Referring to FIG. 1, the connector 10 is shown about to be inserted around a three-wire electric connection comprised of a crimped sleeve 16 which holds the ends of wires 18 and 20 which are covered with an insulating varnish and the exposed wire 22 of an insulated conductor 24 in electrical contact with each other.

After the connector 10 is slipped onto the wires at an assembly station, it is frequently desirable to maintain the relative positions of the electric connection and of the connector. This may be accomplished in simple fashion utilizing the tackiness of the inner layer 14.

Figure 2:
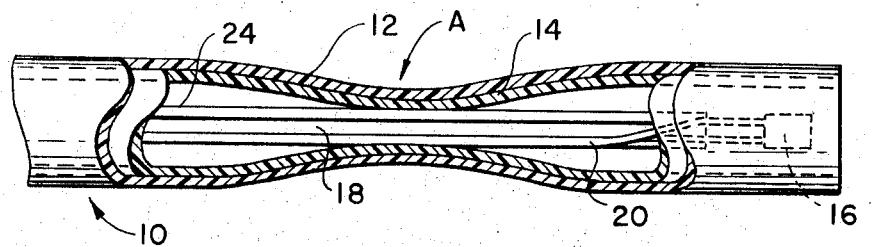
FIG. 2 is a longitudinal cross sectional view of another embodiment of the invention in which the connector is initially secured to the electrical conductor by pinching an intermediate portion of the connector.

FIG. 2 illustrates one application of the tackiness of the inner layer in which an intermediate section along the length of the connector 10 is pinched down in the region A around the conductors so that portions of the soft, adhesive inner layer 14 unite to each other usually also to the conductors, and temporarily fix the connector in position.

Figure 3:
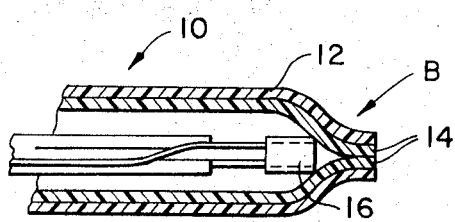
FIG. 3 is a longitudinal cross sectional view in which one end of the connector of the invention has been pinched closed.

FIG. 3 illustrates another embodiment of the invention in which the connector 10 is temporarily fixed in position relative to the conductors by providing the connector with a pinched end B so that opposed upper and lower portions of the inner layer 14 bond to each other. In some assembly operations, the end B will be pinched closed after insertion of the conductors into the connector 10. In other instances, it will be more convenient to previously form the closed end B on the conductor. This is particularly true when the assembly operation is so designed that the conductors and the connector when in position would be elevated at an angle to the horizontal so the connector tends to slide downwardly due to the gravity.

Figure 4:
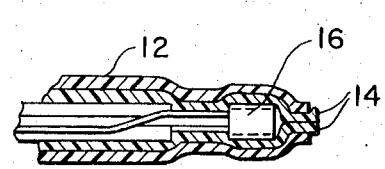
FIG. 4 is a view similar to FIG. 3 illustrating the position of the parts after the connector has been subjected to heat to shrink the outer layer.

After the connector is in place, the unit is transported to a heating station which may be an oven, a bank of infrared heating lamps, or other heating means. At the heating station, the heat-shrinkable outer layer 12 is heated and contracts inwardly while at the same time the inner layer 14 flows under the combined action of the heat and the contraction of the outer layer and completely encases the electric joint as seen in FIG. 4. In addition to acting as a sealant, the inner layer being relatively soft functions as a cushioning layer for electrical wires. In the event that fine wires 18, 20 and/or 22 are utilized, these wires might break if there was no cushioning material, i.e., if only a heat-shrinkable layer was present without the soft inner layer 14.

As pointed out previously, it is a feature of the invention that the amount of heat imparted to the connector 10 in the heating station is insufficient to raise the temperature of the connector and the encased conductors to the maximum design temperature for the wires which, in the case of some electrical wiring employing insulating varnish is as low as 200°F.

The tubular laminated connectors of the invention may be produced utilizing apparatus generally similar to that disclosed in Mills et al., U.S. Pat. No. 3,347,274 which discloses apparatus for winding three narrow film strips about the periphery of a mandrel employing a winding belt wrapped about the strips and mandrel and driven by a driving wheel. In order to provide the continuous inner layer 14, minor modifications are made in the extrusion apparatus shown in said Mills et al patent so that a continuous inner layer is solution extruded onto the inner surface of the spirally wound outer layer.

The invention will be further illustrated by the following non-limiting example.

EXAMPLE

A formulation for preparing a soft inner layer 14 was produced by mixing the following components:

| | |
|---|---|
| Polyvinyl acetate-methyl alcohol solution (50% solids) | 77.12% |
| Solid polyvinyl acetate polymer | 6.28% |

-Continued

| | |
|---|---|
| Plasticizer, phthalate ester | 9.93% |
| Adogen, No. 572, n-oleyl propylene diamine | 0.95% |
| Cab-o-sil, silica, thickener | 6.47% |
| Red dye | 0.05% |

This formulation was solution extruded onto the inner surface of a spirally wound polyethylene terephthalate tube just after the point of tube formation utilizing a mandrel and a winding belt to produce the spirally wound tube. The methyl alcohol solvent was evaporated leaving a laminated tubular product having a spirally wound polyvinyl terephthalate outer layer and a relatively soft inner layer consisting essentially of polyvinyl acetate. After being cut to suitable lengths, the resulting laminated tubes are useful as electrical connectors in the manner described previously in this specification.

While presently preferred embodiments of the invention have been shown and described with particularity, it will be appreciated that various changes and modifications may readily suggest themselves to those of ordinary skill in the art upon being apprised of the present invention. It is intended to encompass all such changes and modifications as fall within the scope and the spirit of the appended claims.

What is claimed is:

1. An electrical connector comprising a laminated tubular member, said tubular member having a squeezable spirally wound heat-shrinkable dielectric outer layer, and a relatively soft innermost layer bonded directly to said outer layer, said innermost layer consisting essentially of a synthetic polymeric pressure-sensitive adhesive at ambient temperatures and having a flow temperature lower than the temperature required to heat shrink said outer layer whereby opposed portions of said innermost layer may be adhesively secured to each other and to a conductor disposed therein by squeezing the connector prior to heat shrinking said outer layer.

2. An electrical connector comprising a laminated tubular member, said tubular member having a squeezable, heat-shrinkable dielectric outer layer comprised of spirally wound polyethylene terephthalate, and a relatively soft innermost layer bonded to said outer layer, said innermost layer being a pressure-sensitive adhesive at ambient temperatures and having a flow temperature lower than the temperature required to heat shrink said outer layer whereby opposed portions of said innermost layer may be adhesively secured to each other and to a conductor disposed therein by squeezing the connector prior to heat shrinking said outer layer.

3. An electrical connector according to claim 2, wherein said innermost layer is primarily a polymer selected from the group consisting of polyvinyl acetate and polyvinyl alcohol.

4. An electrical connector comprising a laminated tubular member, said tubular member having a squeezable, heat-shrinkable dielectric outer layer, and a relatively soft innermost layer bonded to said outer layer, said innermost layer being a polymer selected from the group consisting of polyvinyl acetate and polyvinyl alcohol, said innermost layer being a pressure-sensitive adhesive at ambient temperatures and having a flow temperature lower than the temperature required to heat shrink said outer layer whereby opposed portions of said innermost layer may be adhesively secured to each other and to a conductor disposed therein by squeezing the connector prior to heat shrinking said outer layer.

5. An electrical connector according to claim 4, wherein said innermost layer is a continuous layer of polyvinyl acetate coextensive in length with the length of said outer layer.

6. An electrical connector according to claim 4, wherein said innermost layer is polyvinyl alcohol.

* * * * *